(12) United States Patent
Sadeh et al.

(10) Patent No.: US 7,280,594 B2
(45) Date of Patent: Oct. 9, 2007

(54) METHOD AND APPARATUS FOR MOTION ESTIMATION IN A SEQUENCE OF DIGITAL IMAGES

(75) Inventors: Yaron M. Sadeh, Kfar Saba (IL); Eldad Melamed, Or-Yehuda (IL)

(73) Assignee: Parthuseeva Ltd., Herzlin (IL)

( * ) Notice: Subject to any disclaimer, the term of this patent is extended or adjusted under 35 U.S.C. 154(b) by 649 days.

(21) Appl. No.: 10/282,133

(22) Filed: Oct. 29, 2002

(65) Prior Publication Data

US 2003/0081675 A1    May 1, 2003

Related U.S. Application Data

(60) Provisional application No. 60/330,707, filed on Oct. 29, 2001.

(51) Int. Cl.
*H04N 7/12*     (2006.01)

(52) U.S. Cl. .............................. 375/240.03; 375/240.16

(58) Field of Classification Search .......... 375/240.16, 375/240.03, 240.18, 240.24; 704/203; 348/429.1; 382/236
See application file for complete search history.

(56) References Cited

U.S. PATENT DOCUMENTS

| | | | | |
|---|---|---|---|---|
| 4,890,160 A | * | 12/1989 | Thomas | .................... 348/429.1 |
| 5,644,361 A | * | 7/1997 | Ran et al. | ............... 375/240.16 |
| 6,011,596 A | | 1/2000 | Burl et al. | |
| 6,532,264 B1 | * | 3/2003 | Kahn | .................... 375/240.16 |
| 6,757,648 B2 | * | 6/2004 | Chen et al. | .................. 704/203 |
| 6,891,889 B2 | * | 5/2005 | Kim et al. | ............. 375/240.03 |

FOREIGN PATENT DOCUMENTS

EP    0 659 021    6/1995

OTHER PUBLICATIONS

Dabner S.C., "Real Time Motion Vector Measurement Hardware", Signal Processing of HDTV, 2, turin, Aug. 30-Sep. 1, 1989, Proceedings of the International Workshop on HDTV, Amsterdam, Elsevier, NL, pp. 117-123.

Koc Ut-Va, "DCT-Based Motion Estimation", IEEE Transactions on Image Processing, IEEE Inc., New York, US, vol. 7, No. 7, Jul. 1, 1998, pp. 948-965.

* cited by examiner

*Primary Examiner*—Gims Philippe
(74) *Attorney, Agent, or Firm*—Pearl Cohen Zedek Latzer, LLP

(57) ABSTRACT

In some embodiments of the present invention, low frequency components for a current block in a current picture and a candidate block in a reference picture are obtained. For each of the low frequency components, quantized phase differences between the current block and the candidate block are calculated. Using the quantized phase differences as an index, coordinates of a global maximum of a correlation function corresponding to the quantized phase differences are retrieved from the table. The coordinates represent a motion vector. A refined candidate block is determined from a spatial search in the vicinity of a candidate block in the reference picture from which the motion vector originates when the motion vector terminates at the current block. The refined candidate block is selected as a reference block for the current block if a matching criterion between the refined candidate block and the current block satisfies a predetermined criterion.

11 Claims, 7 Drawing Sheets

| 24 | 16 | 12 | 14 | 22 |
|----|----|----|----|----|
| 20 | 7  | 4  | 6  | 18 |
| 11 | 3  | 1  | 2  | 10 |
| 21 | 9  | 5  | 8  | 19 |
| 25 | 17 | 13 | 15 | 23 |

FIG. 4

METHOD AND APPARATUS FOR MOTION ESTIMATION IN A SEQUENCE OF DIGITAL IMAGES

CROSS-REFERENCE TO RELATED APPLICATIONS

This application claims the benefit of provisional patent application Ser. No. 60/330,707 entitled "MOTION ESTIMATOR EMPLOYING IMPROVED PHASE CORRELATION AND FAST BLOCK-MATCHING SEARCH ALGORITHMS" and filed Oct. 29, 2001.

BACKGROUND OF THE INVENTION

Redundancy in a sequence of digital images may occur when the appearance of a given picture is similar to that of a previous or subsequent picture in the sequence. Many compression techniques take advantage of this redundancy by expressing the differences of a current region in the picture to a reference region in a previous or subsequent picture in the sequence. In particular, when the same object occurs in both regions, but at different locations within the picture, the change in location may be encoded as a motion vector.

Usually the picture is divided into blocks. In such cases, motion estimation is the process of finding the block in the reference picture that bests matches the current block presently being encoded in the current picture. Typically, the block that globally minimizes a matching criterion is selected as the best matched block—the reference block.

Motion estimation is one of the most intensive computation components of an encoder. Some of the existing motion estimation techniques, when implemented on a digital signal processor or all application specific integrated circuit, require more memory than that available internally. Accessing external memory imposes a severe delay in a real-time system.

Therefore, it would be beneficial to reduce the amount of time spent on such computations and to reduce the amount of memory required to perform the computations while providing accurate motion vectors.

BRIEF DESCRIPTION OF THE DRAWINGS AND APPENDIX A

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

FIG. 4 is an illustration of a search area consisting of 5×5 blocks of 16×16 pixels, in accordance with some embodiments of the present invention;

Figure 1A:
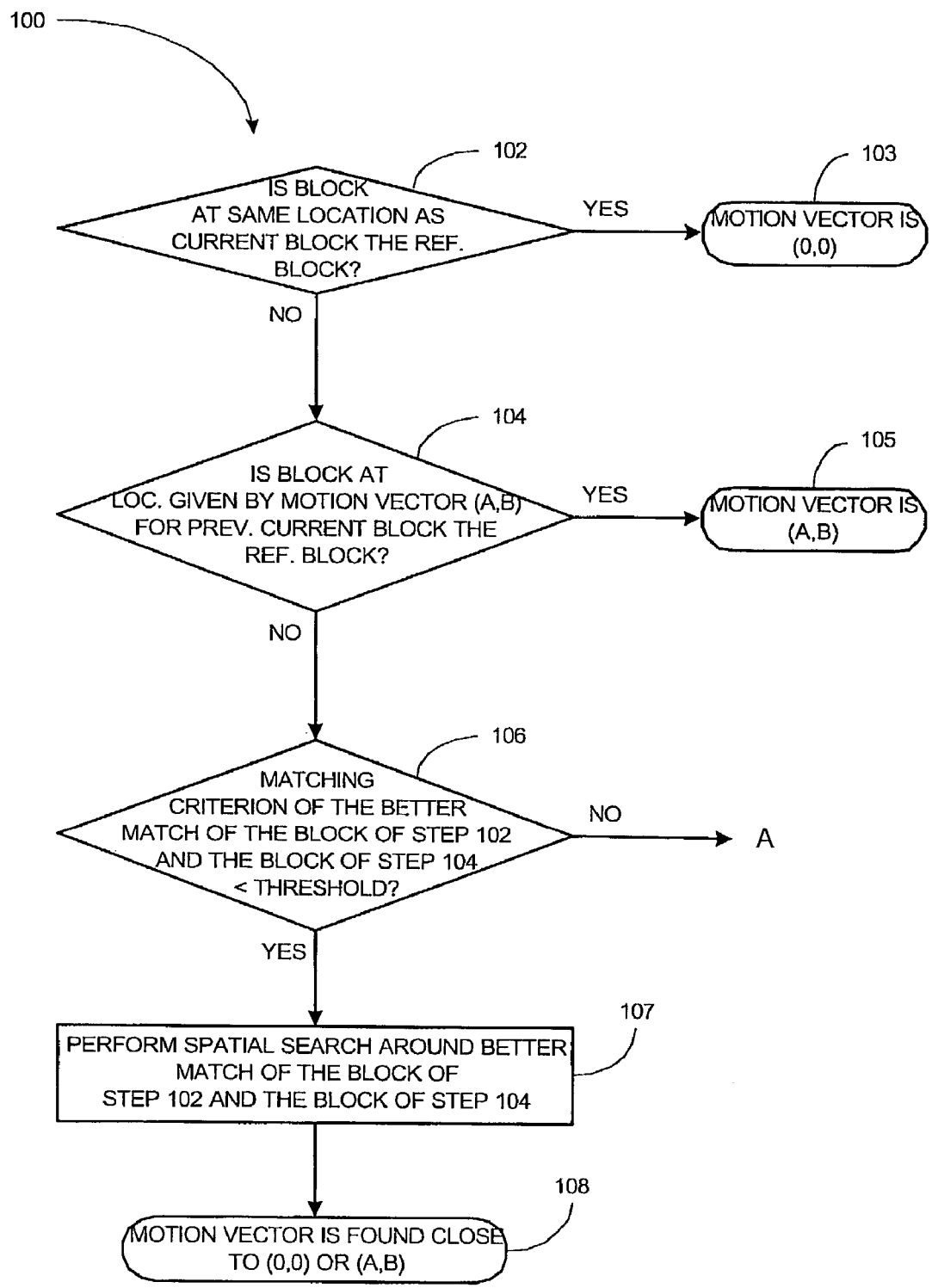
FIGS. 1A and 1B are a flowchart illustration of a method to estimate a motion vector according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Some embodiments of the present invention are directed to methods of estimating a motion vector for a block of pixels in a sequence of digital images. The motion vector indicates the location of the current block in the current picture relative to its location in a reference picture. The reference picture may be a previous picture or a subsequent picture in the sequence. Although the methods are described hereinbelow as applied to blocks of 16×16 pixels, it is clear to one of ordinary skill in the art that the methods may be applied to blocks of a different size.

Methods according to some embodiments of the present invention may be performed by any suitable computing unit, including but not limited to the central processing unit of a computer, a processor, a digital signal processor, dedicated hardware, or any combination of the above. Software code representing the method may be stored in memory accessible by the computing unit.

An apparatus comprising a computing unit to perform methods according to some embodiments of the present invention may be part of a data compression encoder or trans-coder. Although the scope of the present invention is not limited in this respect, in the particular example of compressed video, the encoder or trans-coder may be part of any of the following products:

a) a set-top box comprising an encoding chip or trans-coder chip, the set-top box being battery operated or non-battery operated;
b) a digital video camera comprising an encoder or trans-coder chip and flash memory or digital video (DV) tape;
c) a digital still camera that supports video encoding and uses flash memory or a compact disc as a storage medium;
d) a multimedia-enabled cellular telephone equipped with a camera and a screen (color or monochrome) for video-conference applications and/or video messaging;
e) a multimedia-enabled plain-old telephone system (POTS) telephone equipped with a camera and a screen (color or monochrome);
f) a personal digital assistant (PDA) comprising an encoding chip and/or encoding software and a color or monochrome screen; and
g) a game-console comprising an encoder or trans-coder chip and a hard drive or magnetic tape.

Figure 1B:
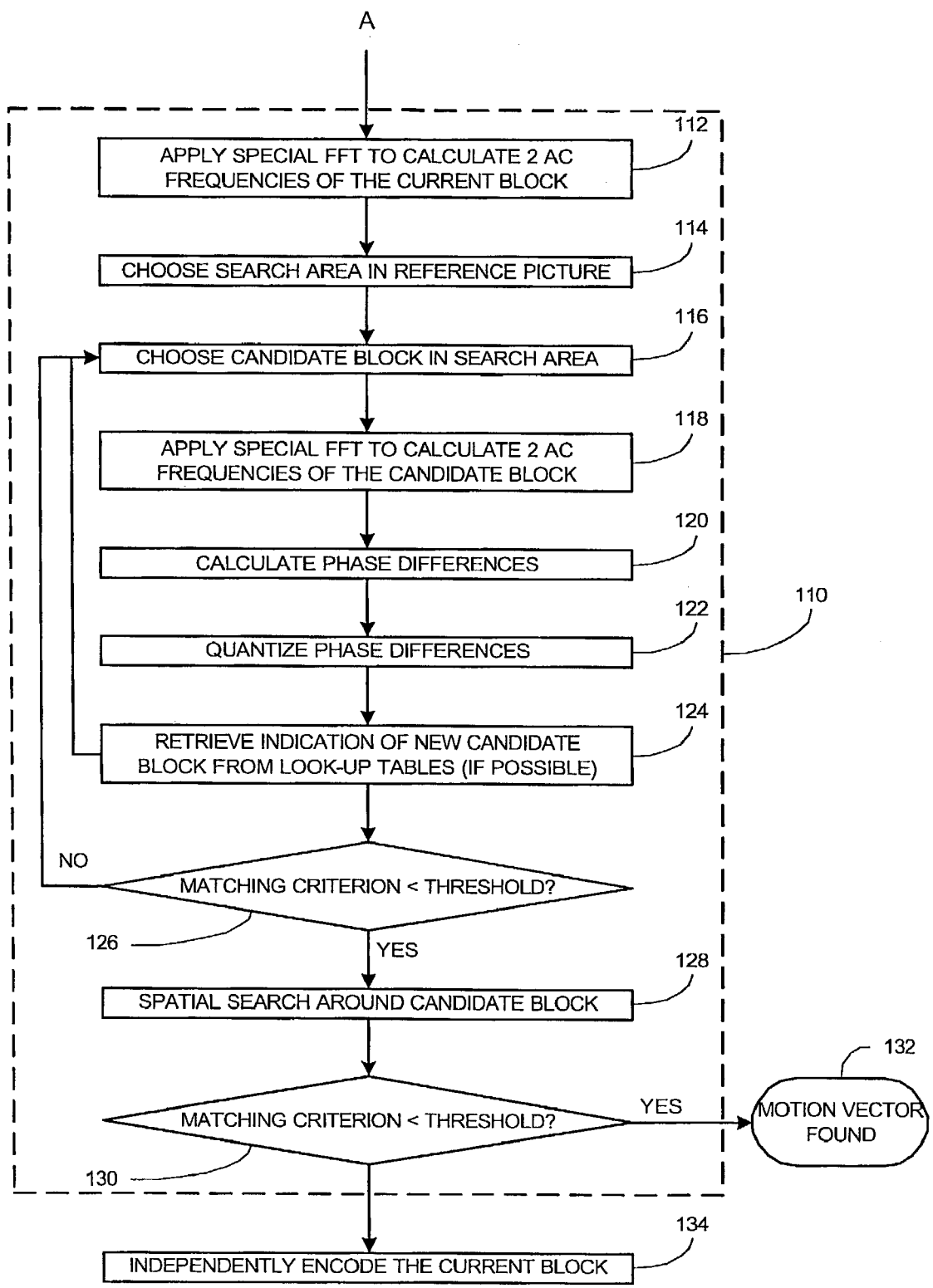

FIGS. 1A and 1B show a flowchart illustration of a method to estimate a motion vector according to an embodiment of the present invention. The method comprises a preliminary search 100 and a main search 110. If both searches fail to produce a motion vector, then it is concluded that there is no appropriate motion vector and the current block is independently encoded (step 134).

Figure 2:
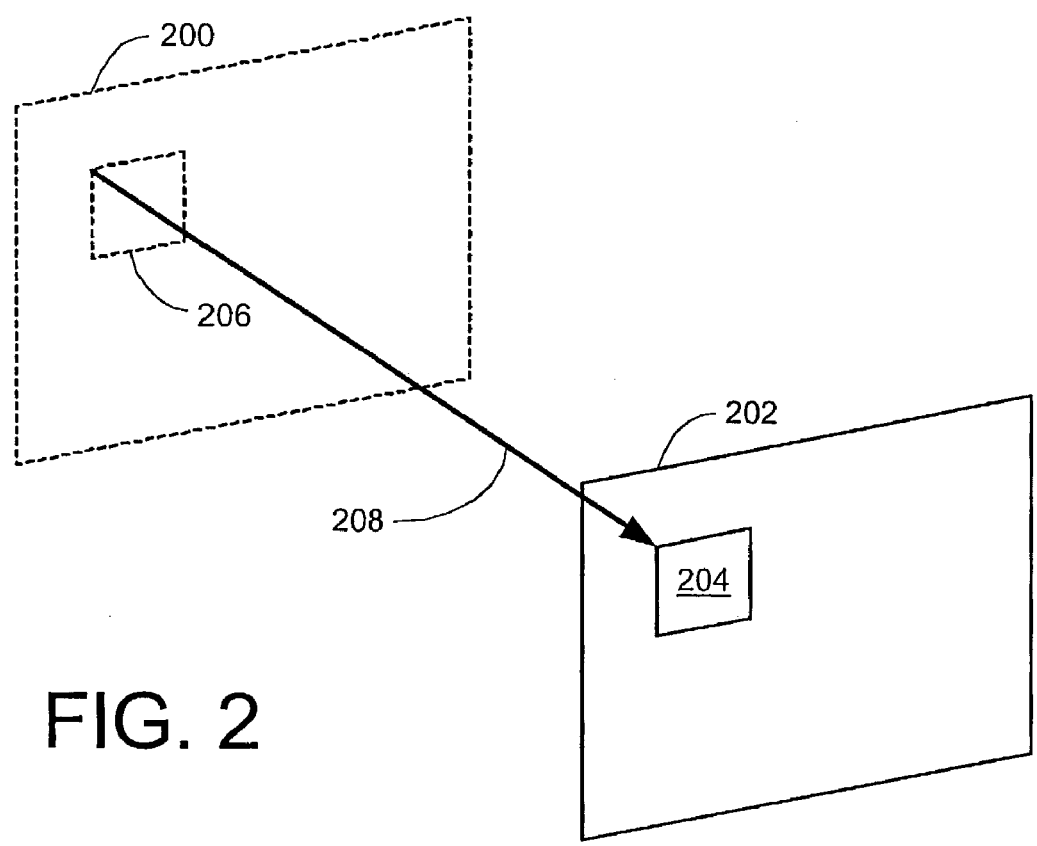
FIG. 2 is an illustration showing a (0,0) motion vector, a current block in a current picture and a candidate block in a reference picture, helpful in understanding some embodiments of the present invention.

The preliminary search 100 described hereinbelow is merely an example and the scope of the present invention includes other preliminary searches, as well as the option of not doing a preliminary search at all. FIG. 2 shows a reference picture 200 and a current picture 202. The current block is designated 204. A candidate block 206 is located within reference picture 200 at the same location as current block 204 in current picture 202. In other words, a motion vector 208 from candidate block 206 to current block 204 is the (0,0) vector. Although motion vector 208 is illustrated in FIG. 2 as being from the top-left corner of block 206 to the top-left corner of block 204, any other self-consistent definition for a motion vector may be used.

It is checked whether candidate block 206 matches current block 204 (step 102 of FIG. 1A). Any suitable match criterion may be used. For example, the mean square errors (MSE), also known as the mean square differences (MSD), may be used. The MSE criterion is defined as follows:

$$MSE = \frac{1}{M \cdot N} \sum_{m=1}^{M} \sum_{n=1}^{N} [P_{m,n} - P_{m,n}^R]^2,$$

where $P_{m,n}$ is the pixel intensity at row m and column n in the current block that contains M×N pixels (in the current example, M=16 and N=16) and $P_{m,n}^R$ is the pixel intensity of the reference block at row m and column n.

In another example, the mean absolute errors (MAE), also known as the mean absolute differences (MAD), may be used. The MAE criterion is defined as follows:

$$MAE = \frac{1}{M \cdot N} \sum_{m=1}^{M} \sum_{n=1}^{N} |P_{m,n} - P_{m,n}^R|.$$

If, for example, the MAE of candidate block 206 and current block 204 is below a first threshold, say 1 (average error per pixel), then candidate block 206 may be considered the reference block for current block 204, and the motion vector is (0,0) (step 103). Clearly any threshold may be used, depending on the quality of the digital images and the desired encoding complexity.

Figure 3:
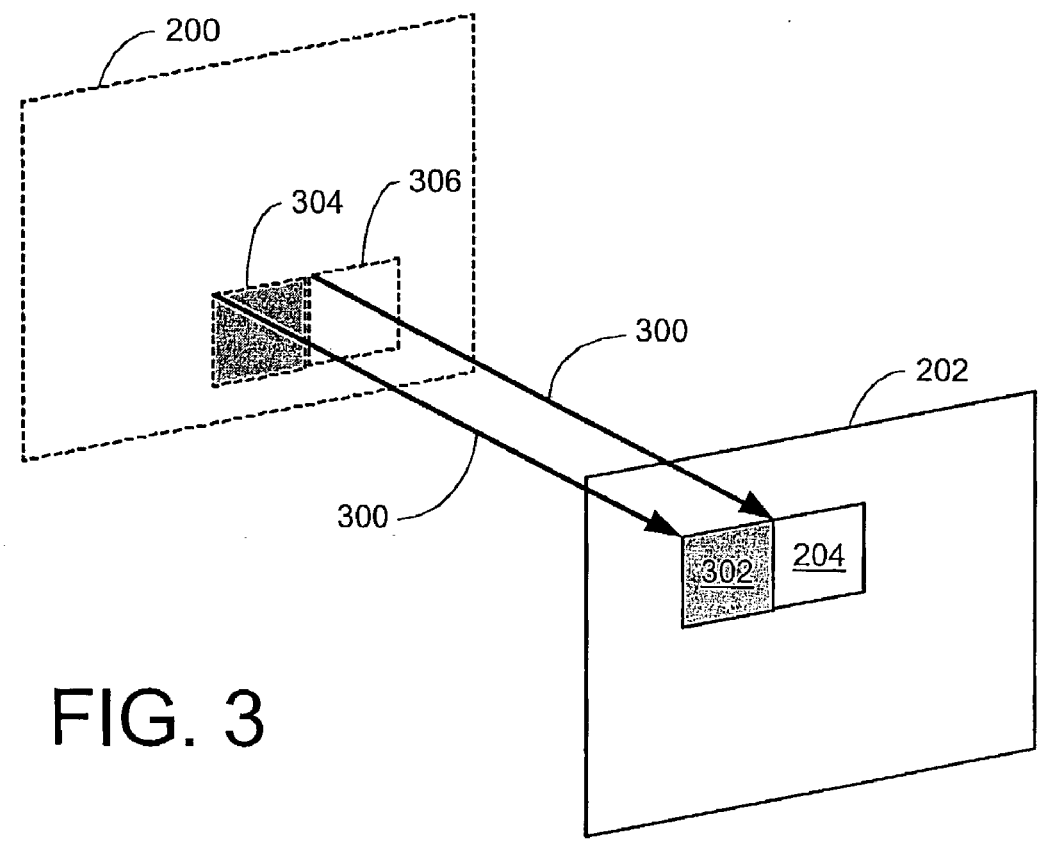
FIG. 3 is an illustration showing a current block and a previously current block in a current picture, the reference block of the previously current block and a candidate block in a reference picture, and the motion vector of the previously current block, helpful in understanding some embodiments of the present invention.

If, however, the MAE is greater than the first threshold, another candidate block is considered in preliminary search 100. FIG. 3 shows reference picture 200, current picture 202 and current block 204. A block in current picture 202 whose motion vector 300 was determined previously is designated 302. The reference block for block 302 is designated 304. If motion vector 300 were to point to the top-left corner of current block 204, it would originate at a block 306 in reference picture 200, which is now considered as the candidate block.

It is checked whether candidate block 306 matches current block 204 (step 104 of FIG. 1A). As before, any suitable match criterion may be used. If, for example, the MAE of candidate block 306 and current block 204 is below a second threshold, say 1 (average error per pixel), then candidate block 306 may be considered the reference block for current block 204, and the motion vector is motion vector 300 (step 105). As before, clearly any threshold may be used, depending on the quality of the digital images and the desired encoding complexity.

If, however, the MAE is greater than the second threshold, then the minimum of the MAE between candidate block 306 and current block 204 and the MAE between candidate block 206 and current block 204, denoted min_MAE, is tested against a third threshold that is larger than the second threshold, for example 6 (average error per pixel) (step 106). If min_MAE is below the third threshold, then a spatial domain search is used in the vicinity of either candidate block 306 or candidate block 206, depending on which candidate block has the minimum MAE (step 107). Spatial domain searches are known in the art. Although the scope of the present invention is not limited in this respect, a block-matching search with a limited range, for example an "xy" search or "one-at-a-time" search with a limitation of 8 steps, may be used to find a suitable motion vector (step 108 of FIG. 1A).

If the MAE is greater than the third threshold, then the main search 110 begins. A special fast Fourier transform (FFT) is applied to current block 204 to obtain 2 AC frequency coefficients of the current block (step 112). These frequency coefficients are at locations (0,1) and (1,0) in the complex frequency plane. These frequency coefficients may give an indication of the global movement of the pixels without being affected by high frequency "noise". Other low-frequency coefficients may also be calculated, for example at locations (0,2) and (2,0). The number of calculated low-frequency coefficients may influence the size of look-up tables created from the indexed value of these frequencies.

The low-frequency coefficients may be calculated using the computer code given in Appendix A or may be calculated using any other FFT method. In particular, since the coefficients located at (1,0) and (0,1) are low-frequency coefficients, it is possible to calculate them using only 32 pixels, 4 pixels per line (located at columns 0, 4, 8, 12) at lines 0, 2, 4, 6, 8, 10, 12 and 14 in the current block.

A search area in reference picture 200 is chosen (step 114). The search area is generally centered at the same location in reference picture 200 as the location of current block 204 in current picture 202, although the scope of the present invention is not limited in this respect. The size of the search area will depend upon a number of factors. For example, performance considerations may lead to a smaller search area. In another example, a large search area is suitable for fast movement and a small search area is suitable for slow movement. Regardless of the size of the search area, once the search method identifies a good enough match (depending on the values of the thresholds), any unsearched portions of the search area are ignored and the match is the reference block that determines the motion vector.

An exemplary search area is illustrated in FIG. 4. A relatively large search area of 80×80 pixels will contain 5×5 non-overlapping blocks of 16×16 pixels, although search areas of different sizes are also within the scope of the present invention, including the example of a search area of 48×48 pixels that contains 3×3 non-overlapping blocks of 16×16 pixels. Typically, but not necessarily, the blocks of 16×16 pixels are fixed relative to the picture, starting from the top-left corner and advancing in 16-pixel jumps to the right and to the bottom. The search area of FIG. 4 is such that the block labeled 1 is at the same location in reference picture 200 as the location of current block 204 in current picture 202.

The order in which the blocks are searched may be determined by statistical calculations so that the blocks with high probability of being the appropriate reference block are searched first. For example, the 25 blocks of FIG. 4 may be searched according to the numbers 1 through 25 appearing in the blocks. However, it will be understood by persons of ordinary skill in that art that many different search orders are within the scope of the present invention.

A candidate block from the search area is chosen using a search order as described hereinabove (step 116). As in step 112 for the current block, a special fast Fourier transform (FFT) is applied to the candidate block to obtain 2 AC frequency coefficients of the candidate block (step 118). These 2 AC frequency coefficients may be stored in an appropriate table so that they do not have to be recalculated in the event that the candidate block is part of a subsequent search area.

The phase differences between the candidate block and current block 204 are calculated (step 120). For example, the phases from the candidate block's 2 AC frequencies are calculated using the inverse tangent function, and then the phases of the current block's 2 AC frequencies are subtracted from them.

The two phase differences are quantized (step 122). Many different quantization techniques may be used. For example, a 40-value quantization may be used for each phase difference, yielding 1600 pairs for the two frequencies. The inverse FFT applied to a given pair of quantized frequencies yields 16×16 correlation values with a well-defined global maximum value (i.e. main peak).

Figure 5:
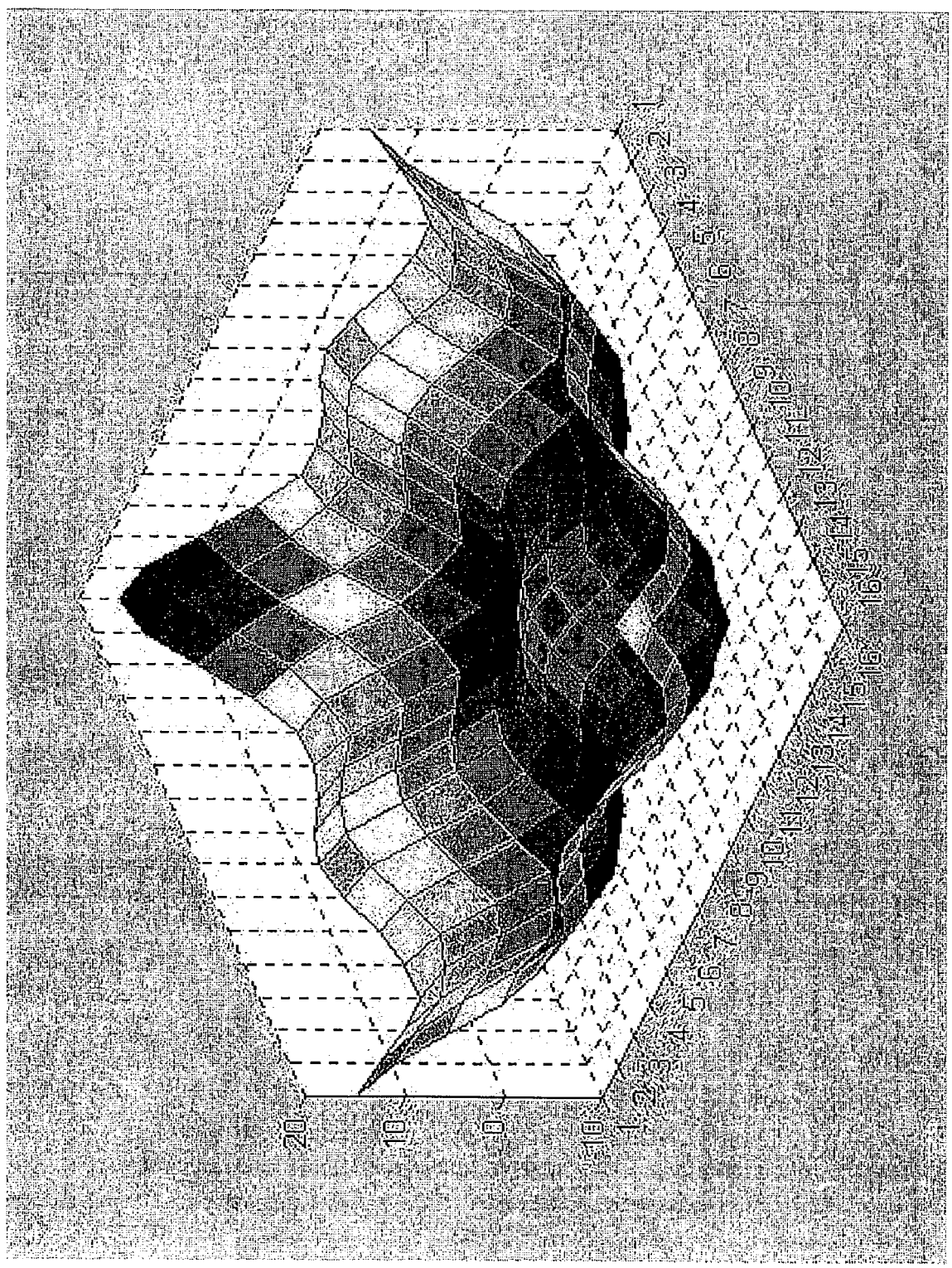
FIG. 5 is a graphical representation of an exemplary correlation function having a maximum at (1,1)
Figure 6:
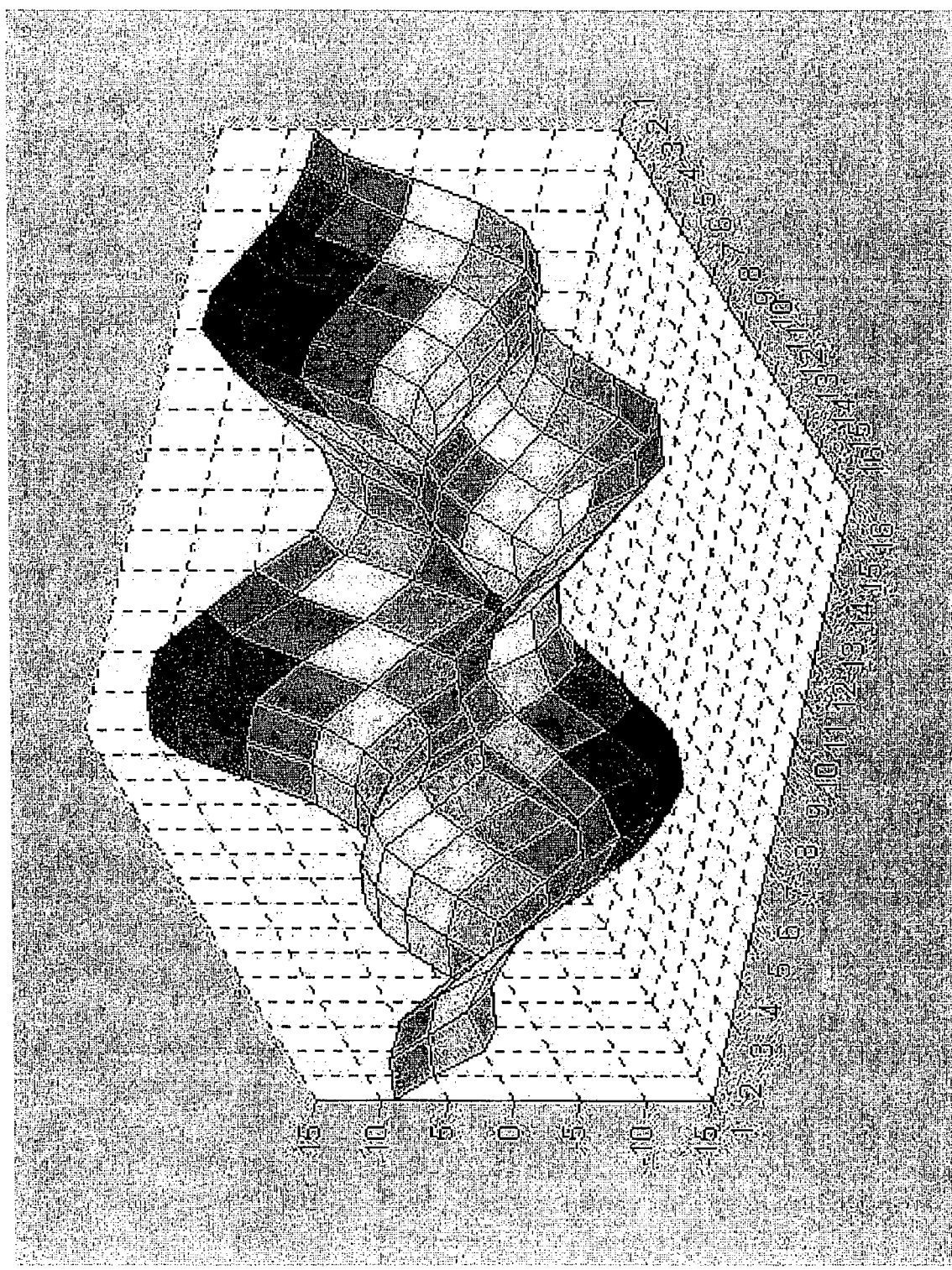
FIG. 6 is a graphical representation of another exemplary correlation function having a maximum at (11,1)

FIG. 5 is a graphical representation of such an exemplary correlation function, where the maximum lies at the (1,1) coordinates. FIG. 6 is a graphical representation of another exemplary correlation function, where the maximum is located at the (11,1) coordinates. The relatively strong local maximum values (and low global maximum value) are due to the restriction of the calculation to 2 AC frequencies (out of a possible 256 frequencies).

Figure 7:
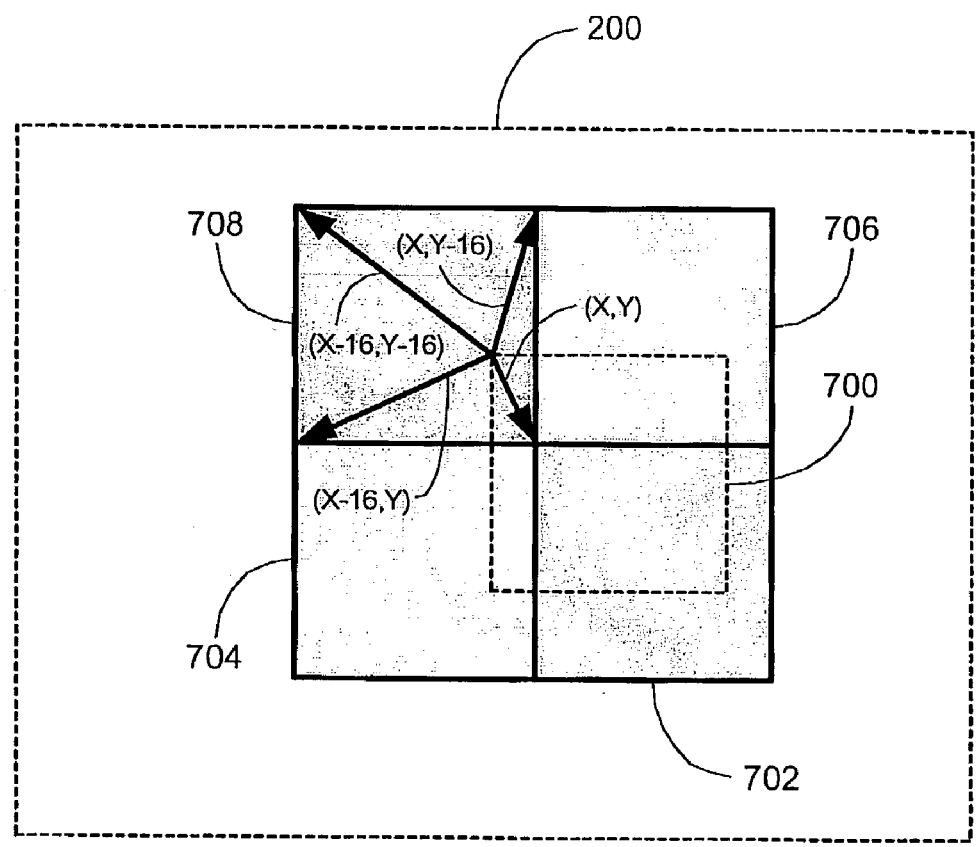
FIG. 7 is an illustration showing a current block in a current picture, four candidate blocks in a reference picture, and motion vectors connecting the candidate blocks to the current block, helpful in understanding some embodiments of the present invention; and Appendix A is exemplary computer code for calculating low frequency coefficients.

FIG. 7 shows reference picture 200 and a candidate block 700 (chosen in step 116 from among the blocks in the search area chosen in step 114). The coordinates at which the global maximum lies, say (U,V) where U and V take values from 1 to 16, correspond to the coordinates (X,Y) where X and Y take values from 0 to 15. The coordinates (X,Y) are used to find a new candidate block that will be a better match than candidate block 700.

The new candidate block is chosen from one of the four possibilities:
1) the 16×16 block 702 whose top-left corner is displaced (X,Y) from the top left corner of candidate block 700;
2) the 16×16 block 704 whose top-left corner is displaced (X−16,Y) from the top left corner of candidate block 700;
3) the 16×16 block 706 whose top left corner is displaced (X,Y−16) from the top left corner of candidate block 700; and
4) the 16×16 block 708 whose top-left corner is displaced (X−16,Y−16) from the top left corner of candidate block 700.

The pair of quantized phase differences (from step 122) is used to retrieve an indication of the appropriate candidate block (of the four possibilities) from a look-up table (step 124). The look-up table was preprocessed to provide the best of the four blocks 702, 704, 706 and 708. The preprocessing comprised a filtering stage of the inverse FFT (IFFT) results, and shifting the vectors' absolute size to lie between the values −8 and 9 (both in the X and Y directions). Furthermore, if the absolute sum of a vector's components (e.g. X and Y) was higher than 12, the resulted motion vector was ignored. This preprocessing may result in none of the four blocks 702, 704, 706 and 708 being selected, in which case the method continues from step 116 to choose the next candidate block in the search area according to the search order.

It is checked whether the new candidate block matches the current block (step 126). As before, any suitable match criterion may be used. If, for example, the MAE of the new candidate block and the current block is above a fourth threshold, say 6 (average error per pixel), then the new candidate block may be considered a poorly matching candidate, and the next candidate block in the search area is chosen according to the search order (step 116). The fourth threshold may be a crude threshold, but as before, clearly any threshold may be used, depending on the quality of the digital images and the desired encoding complexity.

If the MAE is below the fourth threshold, then a refinement of the motion vector originating at the new candidate block is performed using a spatial domain search, as is known in the all (step 128). Although the scope of the present invention is not limited in this respect, a block-matching search with a limited range, for example an "xy" search or "one-at-a-time" search with a limitation of 8 steps, may be used. The result of the spatial search is a refined motion vector that originates at a refined candidate block.

It is checked whether the refined candidate block matches the current block (step 130). As before, any suitable match criterion may be used. If, for example, the MAE of the refined candidate block and the current block is below a fifth threshold, say 16 (average error per pixel), then the refined candidate block is the reference block and the refined motion vector originating at the refined candidate block is the desired motion vector (step 132). The fifth threshold may be a crude threshold, but as before, clearly any threshold may be used, depending on the quality of the digital images and the desired encoding complexity.

If the MAE is above the fifth threshold, or if the method never reaches step 128 after having searched all the blocks in the search area, then it is concluded that no reference block exists for the current block. In this case, the current block is encoded independently (step 134). If the current block is compatible with the MPEG-2 standard, then it should be considered as an intra (I) block.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

APPENDIX A

```
//////////////////////////////////////////////////////      //
// FFT calculation for 2 frequency coefficients at locations (1,0)   //
// and (0,1) of a 16 x 16 coefficient matrix                         //
// Pixel data is taken from lines 0,2,4,6,8,10,12,14 at columns      //
// 0,4,8,12 of the matrix Pixel_data                                 //
//////////////////////////////////////////////////////      //
int Pixel_data[16] [16];  // The matrix containing the pixels
int Real1,Real2;          // Real parts of coefficients (0,1) and (1,0)
int Imag1,Imag2;          // Imaginary parts of coeff. (0,1) and (1,0)
int Sum2,Sum6,Sum10,Sum14    // Temporary sums used in the calculations
// Calculation for first coefficient at location (0,1)
Real1 =    (Pixel_data[0] [0] + Pixel_data[2] [0] + Pixel_data[4] [0] +
            Pixel_data[6] [0] + Pixel_data[8] [0] + Pixel_data[10] [0] +
            Pixel_data[12] [0] + Pixel_data[14] [0]) –
           (Pixel_data [0] [8] + Pixel_data[2] [8] + Pixel_data[4] [8] +
            Pixel_data[6] [8] + Pixel_data[8] [8] + Pixel_data[10] [8] +
            Pixel_data[12] [8] + Pixel_data[14] [8]);
Imag1 =    (Pixel_data[0] [12] + Pixel_data[2] [12] + Pixel_data[4] [12] +
            Pixel_data[6] [12] + Pixel_data[8] [12] + Pixel_data[10] [12] +
            Pixel_data[12] [12] + Pixel_data[14] [12]) –
           (Pixel_data[0] [4] + Pixel_data[2] [4] + Pixel_data[4] [4] +
            Pixel_data[6] [4] + Pixel_data[8] [4] + Pixel_data[10] [4] +
            Pixel_data[12] [4] + Pixel_data[14] [4]);
Real1 =    Real1 >> 5; // shift right 5 bits
Imag1 =    Imag1 >> 5; // shift right 5 bits
// Calculation for second coefficient at location (1,0)
Sum2 =     Pixel_data[2] [0] + Pixel_data[2] [4] + Pixel_data[2] [8] +
           Pixel_data[2] [12];
Sum6 =     Pixel_data[6] [0] + Pixel_data[6] [4] + Pixel_data[6] [8] +
           Pixel_data[6] [12];
Sum10 =    Pixel_data[10] [0] + Pixel_data[10] [4] + Pixel_data[10] [8] +
           Pixel_data[10] [12];
Sum14 =    Pixel_data[14] [0] + Pixel_data[14] [4] + Pixel_data[14] [8] +
           Pixel_data[14] [12];
Real2 =    1024*(Pixel_data[0] [0] + Pixel_data[0] [4] + Pixel_data[0] [8] +
           Pixel_data[0] [12] –
           (Pixel_data[8] [0] + Pixel_data[8] [4] + Pixel_data[8] [8] +
           Pixel_data[8] [12]) ) +
           724*(Sum2 – Sum6 – Sum10 + sum14);
Imag2 =    1024*(Pixel_data[12] [0] + Pixel_data[12] [4] + Pixel_data[12] [8] +
           Pixel_data[12] [12] –
           (Pixel_data[4] [0] + Pixel_data[4] [4] + Pixel_data[4] [8] +
           Pixel_data[4] [12]) ) –
           724*(Sum2 + Sum6 – Sum10 + Sum14);
Real2 =    Real2 >> 15; // shift right 15 bits
Imag2 =    Imag2 >> 15; // shift right 15 bits
```

What is claimed is:

1. A method comprising:
   creating a look-up table of motion vectors indexed by all possible combinations of quantized phase differences, each of said motion vectors corresponding to a global maximum of a correlation function corresponding to one of said sets of quantized phase differences;
   quantizing phase differences between a current block in a current picture and a candidate block in a reference picture; and
   using sets of the quantized phase differences as an index to the look-up table of motion vectors.

2. The method of claim 1, wherein creating the look-up table comprises for each set of possible quantized phase differences between two blocks of digital video data to perform the operation of:
   applying an inverse fast Fourier transform to said set to obtain correlation data;
   identifying motion vectors corresponding to a global maximum of said correlation data; and
   storing a motion vector corresponding to a best of said motion vectors in a table indexed by said set of quantized phase differences.

3. A method comprising:
   using a phase-correlation method to search for a reference block in a reference picture to match a current block in a current picture in a search area in said reference picture comprising non-overlapping blocks of the same size as said current block,
   wherein said phase-correlation method comprises retrieving a motion vector from a look-up table indexed by possible combinations of quantized phase differences.

4. The method of claim 1 comprising:
   calculating low frequency components of a block of digital image data from a small portion of said block of digital image data; and
   quantizing phase differences for each of said low frequency components.

5. The method of claim 1 comprising:
   determining from the look-up table, a motion vector directing from the candidate block in the reference picture to the current block in the current picture based on quantized phase differences for low frequency components of said reference block and said current block.

6. A method comprising:
obtaining low frequency components for both a current block in a current picture and a candidate block in a reference picture;
calculating and quantizing phase differences between said current block and said candidate block from each of said low frequency components;
retrieving from a table coordinates of a global maximum of a correlation function corresponding to said quantized phase differences, said coordinates representing a motion vector;
performing a spatial search in the vicinity of a candidate block in said reference picture from which said motion vector originates when said motion vector terminates at said current block to determine a refined candidate block; and
selecting said refined candidate block as a reference block for said current block if a matching criterion between said refined candidate block and said current block satisfies a predetermined criterion.

7. An article comprising: a computer readable medium storing instructions that enable a computer to:
create a look-up table of motion vectors indexed by all possible combinations of quantized phase differences, each of said motion vectors corresponding to a global maximum of a correlation function corresponding to one of said sets of quantized phase differences;
use sets of the quantized phase differences as an index to the look-up table of motion vectors.

8. The article of claim 7 wherein said instructions enable a computer to perform for each set of possible quantized phase differences between two blocks of digital video data the following:
apply an inverse fast Fourier transform to said set to obtain correlation data;
identify motion vectors corresponding to a global maximum of said correlation data; and
store a motion vector corresponding to a best of said motion vectors in a table indexed by said set of quantized phase differences.

9. An article comprising: a computer readable medium storing instructions that enable a computer to:
determine a motion vector from a reference block in a reference picture to a current block in a current picture from quantized phase differences for low frequency components of said reference block and said current block.

10. An apparatus comprising:
a video compression encoder to quantize phase differences between a current block in a current picture and a candidate block in a reference picture and to use sets of quantized phase differences as an index to a look-up table of motion vectors, each of said motion vectors corresponding to one of said sets of quantized phase differences.

11. An apparatus comprising:
a video compression encoder to determine a motion vector from a reference block in a reference picture to a current block in a current picture from quantized phase differences for low frequency components of said reference block and said current block.

* * * * *